Sept. 15, 1931.        G. W. HEBBELER        1,823,448
STORAGE BATTERY
Original Filed Aug. 15, 1925        2 Sheets-Sheet 1
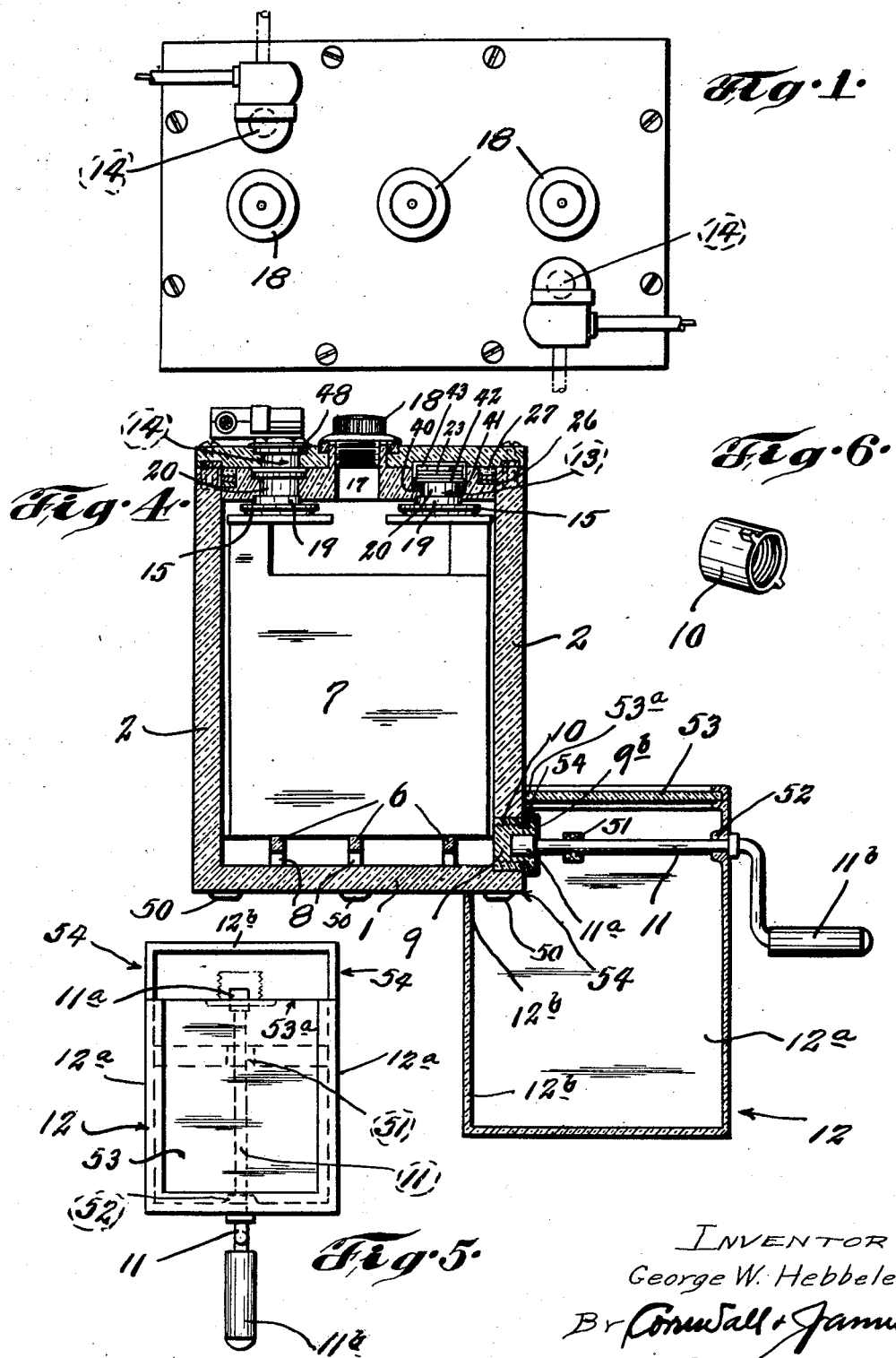
INVENTOR
George W. Hebbeler
By Cornwall & James
ATTORNEYS

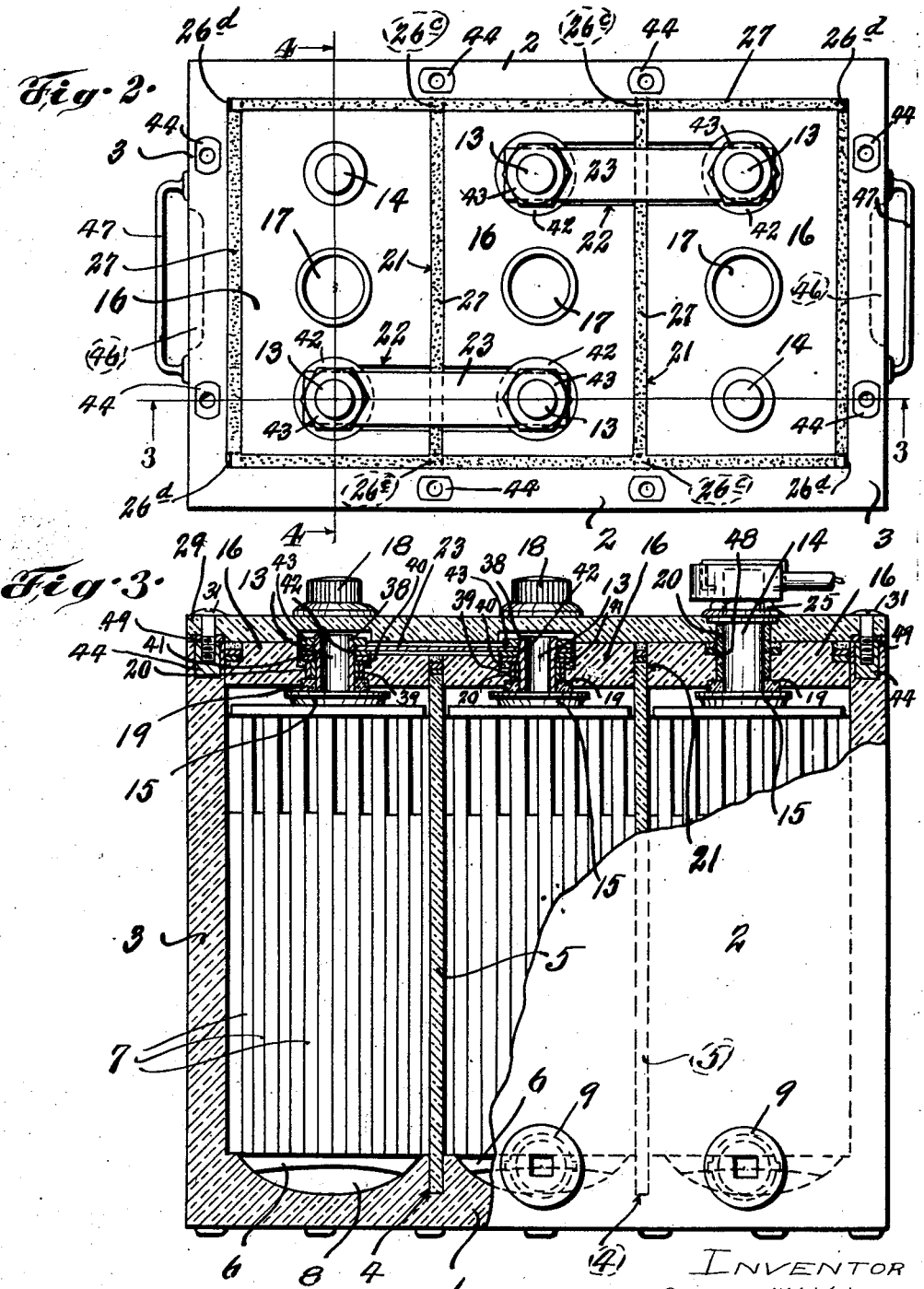

Patented Sept. 15, 1931

1,823,448

UNITED STATES PATENT OFFICE

GEORGE W. HEBBELER, OF ST. LOUIS, MISSOURI

STORAGE BATTERY

Original application filed August 15, 1925, Serial No. 50,448. Patent No. 1,712,822, dated May 14, 1929. Divided and this application filed October 31, 1928. Serial No. 316,312.

This invention relates generally to storage batteries and more particularly to means for draining the storage batteries.

The present application is a division of an application for United States Letters Patent filed by me August 15, 1925, Serial No. 50,448, which eventuated in United States Letters Patent No. 1,712,822, dated May 14, 1929.

The essential points of the present invention are the provision of a storage battery which can be drained of its electrolyte without the necessity of disassembling or inverting the battery, thereby obviating the danger of injury to the person or clothing from the electrolyte and damage to the battery from improper handling, and to provide readily manipulated means for draining the electrolyte from said battery and for receiving said electrolyte in a suitable receptacle, thereby facilitating the periodical removal of the sediment from the battery and prolonging the life and usefulness thereof.

Further objects of the invention are to provide a storage battery having drain openings arranged in one of its walls adjacent to the bottom of the battery and to provide a suitable receptacle adapted to be fitted against the bottom and side of said battery below said drain openings to receive the electrolyte discharged therefrom whereby the sediment accumulated in the battery is removed with said electrolyte, whereupon the latter can be strained and returned to the battery, and to provide suitable manually operated means contained in said receptacle and adapted to engage the drain plugs of said storage battery when said receptacle is placed in position in correlation therewith, said means being operable exteriorly of said receptacle so that all danger of spilling the electrolyte or coming in contact therewith is eliminated.

Other objects of the invention are to provide a storage battery having drain openings arranged in one of its walls, which drain openings are provided with renewable bushings threaded to receive the drain plugs, and to provide a drainage vessel having a closed top and provided with a cutaway portion which is adapted to be fitted against the bottom and side of the storage battery so as to enclose the drain opening, said drainage vessel being provided with a suitable manually operable tool for engaging and operating said drain plug.

With these and other objects in view, my invention consists in certain novel features of construction and arrangement of parts, hereinafter more fully described and claimed and illustrated in the accompanying drawings, in which—

Figure 1 is a top view of the complete battery.

Figure 2 is an enlarged top plan view thereof with the lid removed.

Figure 3 is in part a longitudinal vertical section taken substantially on line 3—3 of Figure 2 and in part is a side elevation of the battery.

Figure 4 is a vertical transverse section through the battery taken substantially on line 4—4 of Figure 2 and showing the application to the battery of a draining apparatus.

Figure 5 is a top plan view of the drainage vessel.

Figure 6 is a detail perspective of a bushing referred to below.

The battery case is preferably made of vulcanized rubber with the bottom wall 1, side walls 2 and end walls 3 all formed integrally. Suitable grooves 4 may be provided in the bottom and side walls of the battery for the purpose of receiving solid partitions 5 adapted to divide the case into separate cell containing or forming chambers. If desired, partitions 5 may be formed integrally with the bottom and side walls of the battery instead of being made of separate pieces inserted in grooves 4. I also prefer to provide integral ribs 6 extending transversely of the bottom of each cell chamber and forming an elevated support for the battery plates 7. The lower portion of each of ribs 6 is recessed as indicated at 8 to provide a clear passageway throughout the length of the cell chamber.

At one end of each cell chamber I provide a removable drain plug 9 which may be threaded into or otherwise interengaged with the sides of an opening in the bottom of the cell chamber. I have illustrated a preferred construction in which the side of the opening is formed by a winged bushing 10 of fiber or other material inserted into the walls of the case. The exterior of plug 9 is adapted to engage a tool, such as is indicated at 11 for the purpose of removing the drain plug. I prefer to provide a drainage vessel 12 with one corner cut away as indicated so that it may be fitted tightly against the bottom and side of the battery case and when so fitted will accommodate the tool 11 so that plug 9 may be removed with vessel 12 in the position shown.

The above described drainage arrangement enables anyone to drain the electrolyte from the case without inverting the battery and without any danger of injury to the person or clothing due to contact with the electrolyte. If the top of the vessel be covered with glass, the protection is complete and at the same time the discharge of the electrolyte or other matter may be observed. After the electrolyte has been removed, the cell chamber may be washed out thoroughly by pouring water into the same through the usual opening provided at the top of the cell chamber and by this means any sediment which may have accumulated on the bottom of the chamber may be discharged through the drain opening. Thereupon the plug may be replaced and the electrolyte poured back into the cell chamber without the seal of the chamber ever having been disturbed. The above described construction affords the layman opportunity to service his battery at intervals and avoid the shortening of the life thereof by short-circuiting of the cell plates through the sediment usually deposited by the shedding of material by the plates.

The positive and negative plates 7 in each cell are respectively united at their upper ends in the usual manner and are provided with upstanding posts 13 or 14. The battery terminal posts 14 are smooth throughout most of their length but have a restricted portion threaded for nuts 25 referred to below. Each of the intermediate posts 13 has its vertical face enclosed by a brass bushing 38 threaded near its upper end and jacketed below its thread with a lead sleeve 39. Each of the posts 13 and 14 is provided with a shoulder 15 which carries a washer 19 of rubber or like material. Above washer 19 each post is enclosed by a rubber tube 20.

Each cell chamber is provided with a cover 16 of vulcanized rubber or other insulating material fitting over tubes 20, resting on washer 19 and extending between the walls of the case and the adjacent partition or partitions 5. Each cover is provided with a central opening 17 which may be closed by a plug 18 in the usual manner.

Around the edge of each cover 16 I provide a groove for receiving sealing means for the cell chamber. This groove may be formed by a rabbet, in the edge of the cover, and the adjacent wall of the case, or it may be formed by the opposing sides of two adjacent covers and the top edge of a partition 5 as indicated at 21 in Figure 3. In sealing the cell chambers, I preferably place a strip of flexible material 26 in the bottom of the groove and over it place enough viscous, or semi-plastic, sealing material 27 to fill the groove. The flexible strip may be formed of fiber or fabric, or may be formed of a combination or any of these materials. The object of this construction is to make it possible for the user to easily remove the sealing material and easily replace it later.

The upper face of each cover is recessed around each post, and around each intermediate post 13 suitable sealing material 40 is placed in the bottom of the recess. A fiber washer 41 covers the sealing material and the upper end of rubber tube 20 and a metal washer 42 overlies fiber member 41. Straps 23 connect posts 13, lying in recesses in the covers 16 and overlying washers 42 and are clamped tightly against said washers by nuts 43 screwed onto the threaded end of the brass bushings 38, the remainder of the bushing being protected by its lead jacket 39. These nuts 43, through straps 23, also clamp the covers 16 against the washers 19 on post shoulders 15 and press the plates 7 onto their supporting ribs 6. Around each terminal post 14 is a seal 48 similar to that provided around covers 16.

The bottom of the case is provided with supporting buttons 50 of rubber or other suitable material to space the bottom 1 from the shelf or strap on which it is carried. These buttons constitute means for cushioning and ventilating the bottom which is always desirable and especially so if the case exterior be formed of wood or other material subject to decay or to damage from electrolyte which otherwise might be held in contact with the case.

Plug 9 is provided with a non-circular recess $9^a$ extending longitudinally thereinto, and tool 11 is provided at its inner end with a similarly shaped enlargement $11^a$ which, when container 12 is in position, engages said recess and imparts to said plug rotating movement, whereby the latter can be screwed in and out of the bushing 10.

Enlargement $11^a$ and recess $9^a$ are of sufficient lengths to enable the retention of said plug on tool 11 when said plug is unseated. Tool 11 is mounted in the upper end of container 12 in suitable bearings 51 and 52 formed therein, and is slidably mounted in said bearings so that it may be moved axially during the seating and unseating of the plug. The outer end of tool 11 is provided with a crank handle 11b in order to facilitate the operation of said tool.

Preferably the top of the container is closed by a glass plate 53 so as to prevent spilling of the liquid and prevent foreign matter from entering said container. The end walls 12a are formed with rearwardly presented right angled notches 54 and the rear edge 53a of plate 53 terminates flush with the upright sides of said notches, while the upper edge 12b of rear wall 12c terminates flush with the horizontally disposed sides of said notches so that said notched portion of the container fits close against the bottom and the side wall of the battery adjacent to each drain opening 10 thereof.

By means of this arrangement, the electrolyte can be readily drained from the battery with safety and without the necessity of inserting and removing plug 9 manually. The bushing 10 can be replaced in case of injury thereto, and both the bushing and drain plug are provided with suitable screw threads to provide a fluid tight joint.

To insure a liquid tight joint between bushing 10 and plug 9, a rubber washer 55 is slipped on said plug and is interposed between the end of said bushing and the annular flange 9b which latter is formed integrally with said plug. When plug 9 is drawn tight, washer 55 not only seals the joint, but also serves by its tension to hold said plug securely against accidental displacement.

In order to locate the receptacle in proper position relatively to the case, and bring the enlargement 11a in axial alignment with plug 9, means are provided to form a guide for said receptacle. In the present case, the width of the receptacle is such that when the latter is placed in proper position the side walls thereof are disposed adjacent to and inside of a pair of spaced buttons 50. Thus by using said buttons as guides, receptacle 12 is so located that tool 11 is arranged coaxially with plug 9.

By periodical draining of the battery and the straining of the electrolyte before returning it to the battery, the latter can be kept free of sediment, thereby prolonging the life of such battery.

No claim is made in the present application to the construction of the battery case as this forms the subject-matter of a copending application, Serial No. 316,311, filed of even date.

Obviously, various changes in the construction and arrangement of parts of my invention can be made and substituted for those herein disclosed, without departing from the spirit of my invention.

I claim:

1. In combination, a battery having a drain opening in one side and a drain closing plug therefor, whereby electrolyte and sediment may be withdrawn from the battery, and a receptacle fitting against said side and bottom of said battery to enclose said drain opening and receive the electrolyte and sediment discharged therethrough, said receptacle having exteriorly projecting means for engaging and removing said plug when so positioned.

2. In combination, a storage battery case provided in one of its side walls near its bottom with a threaded drain opening for discharging the electrolyte and sediment from said case, a drain plug screw-seated in said opening for sealing the same, a receptacle positionable against said side and bottom of said case adjacent to and surrounding said drain opening for receiving the electrolyte and sediment from said battery, and a tool operatively mounted in said receptacle and engageable with said plug for seating and unseating the same.

3. In combination, a storage battery case provided in one of its side walls near its bottom with a drain opening for discharging the electrolyte and sediment from said battery, a drain plug removably seated in said opening for closing the same, a receptacle having its top and one side provided with a corner opening whereby said receptacle is adapted to be placed against the bottom and said side wall of said case adjacent to and surrounding said drain opening for receiving the electrolyte and sediment discharged therefrom, and a tool freely mounted near the top of said receptacle and having its inner end adapted to engage said plug for seating and unseating the same and having its opposite end projecting outwardly from said receptacle for manual operation.

4. In a storage battery construction, the combination of a case therefor provided in one of its side walls near its bottom with a threaded drain opening for discharging the electrolyte and sediment from said battery, a drain plug screw-seated in said opening for sealing the same, a receptacle closed on all sides and having a corner post portion cut away to form a stepped opening whereby said receptacle is adapted to be placed against the bottom and said side wall of said case for receiving the electrolyte and sediment discharged therefrom, and a tool freely journaled near the top of said receptacle transversely of said stepped opening and having its inner end adapted to form detachable non-rotative engagement with said plug for seating and unseating the same and having its opposite end projecting from said receptacle and terminating in a crank handle for manually operating said tool.

5. In a storage battery construction, the combination of a case therefor provided in one of its side walls near its bottom with a drain opening for discharging the electrolyte and sediment from said battery, a drain plug removably seated in said opening for closing the same, a receptacle having its top portion cut away whereby it is adapted to be placed against the bottom and said side wall of said case adjacent to and surrounding said drain opening for receiving the electrolyte and sediment discharged therefrom, a tool freely journaled in said receptacle near the top thereof and having its inner end adapted to engage said plug for seating and unseating the same and having its opposite end projecting outwardly from said receptacle for manual operation, and means on the walls of said case for spacing said receptacle relatively to the latter and bringing said tool in alignment with said plug.

6. In a device of the class described, the combination with a storage battery provided in one of its side walls near the bottom thereof with a drain opening, of a drainage receptacle having its upper end formed on one side with a notched opening adapted to fit against said bottom and said side wall of said battery case, and to enclose the drain opening thereof whereby said receptacle is adapted to receive the electrolyte and sediment discharged from said case, and a tool horizontally and revolubly disposed in the upper end of said receptacle, said tool having one end engageable with the drain plug when said receptacle is in position, the opposite end of said tool extending outwardly from said receptacle and being manually operable to seat and unseat said plug.

7. In combination with a storage battery the case of which is provided in one of its side walls with a drain opening and a drain plug removably seated therein, of a drainage receptacle having its top provided with a rearwardly and upwardly presented notched opening coextensive with the width of said receptacle whereby the latter can be fitted against the bottom and said apertured side wall of said case for receiving the electrolyte and sediment discharged through said drain opening, and manually operable means in said receptacle for seating and unseating said drain plug.

8. In a storage battery construction, the combination with the case therefor having a drain opening in one of its side walls and a removable drain plug for closing the same, of a drainage receptacle having its top provided with a rearwardly and upwardly presented notched opening coextensive with the width of said receptacle whereby the latter can be fitted against the bottom and said side wall of said battery for receiving the electrolyte and sediment discharged therefrom, coaxial spaced bearings formed within said receptacle near the top thereof at right angle to said opening, and a tool revolubly mounted in said bearings and having one end engageable with said drain plug for seating and unseating the same, the opposite end of said tool being extended outwardly from said receptacle for providing manual operation of said tool.

In testimony whereof I hereunto affix my signature this 8th day of October, 1928.

GEORGE W. HEBBELER.